United States Patent
Qi

(10) Patent No.: US 11,206,632 B2
(45) Date of Patent: Dec. 21, 2021

(54) POSITION OF USER EQUIPMENT

(71) Applicant: Samsung Electronics Co., Ltd., Suwon-si (KR)

(72) Inventor: Yinan Qi, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/791,980

(22) Filed: Feb. 14, 2020

(65) Prior Publication Data

US 2020/0267685 A1  Aug. 20, 2020

(30) Foreign Application Priority Data

Feb. 14, 2019 (GB) ..................... 1902051
Feb. 14, 2020 (KR) ............. 10-2020-0018586

(51) Int. Cl.
*H04W 64/00* (2009.01)
*H04W 24/10* (2009.01)
(Continued)

(52) U.S. Cl.
CPC ........ *H04W 64/003* (2013.01); *H04B 7/0617* (2013.01); *H04W 4/029* (2018.02);
(Continued)

(58) Field of Classification Search
CPC ..... H04W 28/22; H04W 52/44; H04W 36/18; H04W 64/003; H04W 64/00; H04W 24/10; H04W 24/02; H04W 36/0061; H04W 52/06; H04W 52/10; H04W 72/085; H04W 4/23

USPC ..... 370/335, 331, 252, 311, 336; 455/456.1, 455/442, 525, 456.2, 456.5, 404.2, 440, 455/571, 513, 456.6
See application file for complete search history.

(56) References Cited

U.S. PATENT DOCUMENTS 6,456,598 B1 * 9/2002 Strat ..................... H04L 1/0009
370/252
6,631,120 B1 * 10/2003 Milbrandt ............... H04L 29/06
370/252

(Continued)

FOREIGN PATENT DOCUMENTS

CN       10418954 B  * 11/2011
EP       3306337 A1    4/2018
(Continued)

OTHER PUBLICATIONS

"Uplink Positioning Architecture and Algorithm for Femtocell Networks" Mar, et al, IEEE, May 2015 (Year: 2015).*
(Continued)

*Primary Examiner* — William D Cumming

(57) ABSTRACT

A method of determining a position of a user equipment (UE) relates to a pre-5th-Generation (5G) or 5G communication system to be provided for supporting higher data rates Beyond 4th-Generation (4G) communication system such as Long Term Evolution (LTE). The method of determining a position of a user equipment (UE) includes measuring, via at least one of a downlink (DL) or an uplink (UL), a first measurement of a set of measurements. The method further comprises estimating, at least in part, the position of the UE using the first measurement of the set of measurements.

14 Claims, 3 Drawing Sheets

(51) Int. Cl.
  *H04W 48/16* (2009.01)
  *H04W 72/04* (2009.01)
  *H04W 4/029* (2018.01)
  *H04B 7/06* (2006.01)

(52) U.S. Cl.
  CPC ............ *H04W 24/10* (2013.01); *H04W 48/16* (2013.01); *H04W 72/042* (2013.01); *H04W 72/0413* (2013.01)

(56) References Cited

U.S. PATENT DOCUMENTS

| | | | | |
|---|---|---|---|---|
| 6,633,545 B1* | 10/2003 | Milbrandt | H04L 1/0002 | 370/252 |
| 6,636,603 B1* | 10/2003 | Milbrandt | H04B 3/46 | 370/255 |
| 6,646,995 B1* | 11/2003 | Le Strat | H04L 1/0009 | 370/252 |
| 6,917,607 B1* | 7/2005 | Yeom | H04W 28/22 | 370/335 |
| 7,082,108 B2* | 7/2006 | Hwang | H04W 52/44 | 370/311 |
| 7,376,428 B2* | 5/2008 | Hottinen | G01S 3/40 | 455/456.1 |
| 7,885,660 B2* | 2/2011 | Rensburg | H04W 36/18 | 455/442 |
| 8,731,579 B2* | 5/2014 | Siomina | G01S 5/04 | 455/456.1 |
| 8,738,041 B2* | 5/2014 | Siomina | H04W 64/003 | 455/456.6 |
| 9,026,140 B2* | 5/2015 | Siomina | H04W 64/00 | 455/456.1 |
| 9,066,262 B2* | 6/2015 | Siomina | H04W 24/10 | |
| 9,131,404 B2* | 9/2015 | Siomina | H04B 7/024 | |
| 9,226,186 B2* | 12/2015 | Centonza | H04W 8/26 | |
| 9,237,541 B2* | 1/2016 | Zhang | G01S 5/06 | |
| 9,253,677 B2* | 2/2016 | Siomina | H04W 24/10 | |
| 9,277,384 B2* | 3/2016 | Siomina | H04W 4/90 | |
| 9,295,041 B2* | 3/2016 | Cai | H04W 52/325 | |
| 9,319,895 B2* | 4/2016 | Siomina | G01S 5/0205 | |
| 9,369,986 B2* | 6/2016 | Zhang | H04W 4/029 | |
| 9,374,662 B2* | 6/2016 | Siomina | H04W 64/00 | |
| 9,445,340 B2* | 9/2016 | Siomina | H04W 64/00 | |
| 9,467,803 B2* | 10/2016 | Siomina | H04W 4/02 | |
| 9,516,570 B2* | 12/2016 | Siomina | H04W 36/30 | |
| 9,654,357 B2* | 5/2017 | Fox | H04L 41/5025 | |
| 9,768,847 B2* | 9/2017 | Frenger | H04B 7/0619 | |
| 9,860,691 B2* | 1/2018 | Siomina | H04W 64/003 | |
| 9,894,634 B2* | 2/2018 | Siomina | G01S 5/0226 | |
| 9,942,709 B2* | 4/2018 | Sung | H04W 4/023 | |
| 10,045,323 B2* | 8/2018 | Li | H04W 72/0473 | |
| 10,397,893 B2* | 8/2019 | Cui | H04W 24/10 | |
| 10,419,259 B1* | 9/2019 | Baldemair | H04W 72/0446 | |
| 10,419,960 B2* | 9/2019 | Siomina | H04W 24/10 | |
| 10,547,979 B2* | 1/2020 | Edge | G01S 5/0036 | |
| 10,684,350 B2* | 6/2020 | Dupray | G01S 5/0263 | |
| 10,736,074 B2* | 8/2020 | Edge | G01S 5/0236 | |
| 10,757,583 B2* | 8/2020 | Ly | H04W 52/242 | |
| 11,006,299 B2* | 5/2021 | Kazmi | H04L 5/0091 | |
| 2004/0002364 A1* | 1/2004 | Trikkonen | H04L 1/0009 | 455/562.1 |
| 2005/0192011 A1* | 9/2005 | Hong | H04W 36/0061 | 455/440 |
| 2005/0282574 A1* | 12/2005 | Li | H04W 52/06 | 455/522 |
| 2006/0046789 A1* | 3/2006 | Huh | H04W 52/10 | 455/571 |
| 2008/0014976 A1* | 1/2008 | Fujita | H04W 72/085 | 455/513 |
| 2009/0154426 A1* | 6/2009 | Perraud | H04W 36/26 | 370/332 |
| 2012/0040687 A1* | 2/2012 | Siomina | H04W 8/24 | 455/456.1 |
| 2012/0129517 A1* | 5/2012 | Fox | H04L 25/03987 | 455/425 |
| 2012/0149430 A1* | 6/2012 | Siomina | G01S 5/10 | 455/525 |
| 2012/0258729 A1* | 10/2012 | Siomina | G01S 5/0215 | 455/456.1 |
| 2013/0033999 A1* | 2/2013 | Siomina | H04W 64/00 | 370/252 |
| 2013/0065612 A1* | 3/2013 | Siomina | H04W 24/02 | 455/456.2 |
| 2013/0188510 A1* | 7/2013 | Siomina | H04W 24/10 | 370/252 |
| 2013/0285855 A1* | 10/2013 | Dupray | G01S 5/0278 | 342/451 |
| 2013/0303199 A1* | 11/2013 | Siomina | H04L 5/0005 | 455/456.5 |
| 2013/0337767 A1* | 12/2013 | Siomina | G01S 5/0205 | 455/404.2 |
| 2014/0016621 A1* | 1/2014 | Zhang | G01S 5/06 | 370/336 |
| 2014/0073356 A1* | 3/2014 | Siomina | G01S 5/0205 | 455/456.2 |
| 2014/0080489 A1* | 3/2014 | Siomina | H04W 64/00 | 455/437 |
| 2014/0080506 A1* | 3/2014 | Siomina | G01S 5/0036 | 455/456.1 |
| 2014/0087754 A1* | 3/2014 | Siomina | G01S 5/0215 | 455/456.1 |
| 2014/0106774 A1* | 4/2014 | Siomina | H04W 64/00 | 455/456.1 |
| 2014/0228051 A1* | 8/2014 | Siomina | H04W 8/24 | 455/456.1 |
| 2014/0274062 A1* | 9/2014 | Centonza | H04W 24/10 | 455/437 |
| 2015/0024737 A1* | 1/2015 | Fox | H04W 24/04 | 455/425 |
| 2015/0208262 A1* | 7/2015 | Siomina | H04W 24/10 | 370/252 |
| 2015/0257121 A1* | 9/2015 | Siomina | G01S 5/0226 | 455/456.6 |
| 2015/0271641 A1* | 9/2015 | Sung | H04W 64/00 | 455/456.6 |
| 2015/0341895 A1* | 11/2015 | Zhang | G01S 5/021 | 455/456.1 |
| 2016/0007222 A1* | 1/2016 | Siomina | H04B 7/024 | 370/252 |
| 2016/0044551 A1* | 2/2016 | Frenger | H04B 7/0617 | 370/252 |
| 2016/0227365 A1* | 8/2016 | Siomina | H04W 64/003 | |
| 2017/0079006 A1* | 3/2017 | Li | H04W 72/0473 | |
| 2017/0188328 A1* | 6/2017 | Cui | H04B 17/318 | |
| 2017/0251385 A1* | 8/2017 | Fox | H04L 41/5035 | |
| 2017/0374637 A1 | 12/2017 | Akkarakaran et al. | | |
| 2018/0324738 A1 | 11/2018 | Stirling-Gallacher et al. | | |
| 2019/0037529 A1* | 1/2019 | Edge | H04W 16/28 | |
| 2019/0053071 A1* | 2/2019 | Ly | H04B 7/0617 | |
| 2019/0230475 A1* | 7/2019 | Edge | H04W 4/029 | |
| 2019/0364492 A1* | 11/2019 | Azizi | H04W 48/16 | |
| 2020/0021949 A1* | 1/2020 | Edge | H04W 64/00 | |
| 2020/0029231 A1* | 1/2020 | Kazmi | H04L 5/0078 | |
| 2020/0037186 A1* | 1/2020 | Thangarasa | H04W 24/10 | |
| 2020/0162849 A1* | 5/2020 | Edge | G01S 5/0236 | |
| 2020/0196298 A1* | 6/2020 | Edge | H04W 4/20 | |
| 2020/0205062 A1* | 6/2020 | Azizi | H04W 68/005 | |
| 2020/0267685 A1* | 8/2020 | Qi | H04W 4/02 | |
| 2020/0314793 A1* | 10/2020 | Kumar | G01S 19/48 | |

FOREIGN PATENT DOCUMENTS

| | | |
|---|---|---|
| JP | 2016500214 A * | 1/2016 |
| WO | 2016/164085 A1 | 10/2016 |

(56) References Cited

FOREIGN PATENT DOCUMENTS

WO 2018208520 A1 11/2018
WO WO-2019031791 A1 * 2/2019 ............ H04W 24/10

OTHER PUBLICATIONS

Overview of Positioning in 5G New Radio by Ryan Keating; Mikko Sälly; Jari Hulkkonen; Juha Karjalainen Published in: 2019 16th International Symposium on Wireless Communication Systems (ISWCS) Oct. 2019 (Year: 2019).*
A Systematic Analysis of Narrowband IoT Quality of Service by Andreas Philipp Matz ,Jose-Angel Fernandez-Prieto,Joaquin Cañada-Bago andUlrich Birkel Feb. 2020 (Year: 2020).*
ETSI TS 138 305 V15.1.0 (Oct. 2018), Technical Specification, 5G; NG Radio Access Network (NG-RAN); Stage 2 functional specification of User Equipment (UE) positioning in NG-RAN (3GPP TS 38.305 version 15.1.0 release 15), Oct. 2018, 62 pages.
3GPP TR 21.905 V16.0.0 (Jun. 2019), Technical Report, 3rd Generation Partnership Project; Technical Specification Group Services and System Aspects; Vocabulary for 3GPP Specifications (Release 16), Jun. 2019, 65 pages.
3GPP TS 23.501 V16.3.0 (Dec. 2019), Technical Specification, 3rd Generation Partnership Project; Technical Specification Group Services and System Aspects; System architecture for the 5G System (5GS); Stage 2 (Release 16), Dec. 2019, 417 pages.
3GPP TS 23.502 V16.3.0 (Dec. 2019), Technical Specification, 3rd Generation Partnership Project; Technical Specification Group Services and System Aspects; Procedures for the 5G System (5GS); Stage 2 (Release 16), Dec. 2019, 558 pages.
International Search Report and Written Opinion of the International Searching Authority in connection with International Application No. PCT/KR2020/02178 dated May 25, 2020, 8 pages.
CATT, "Discussion of Potential Techniques for NR Positioning," R1-1812615, 3GPP TSG RAN WG1 Meeting #95, Spokane, USA, Nov. 12-16, 2018, 15 pages.
Huawei, et al., "Uplink based solutions for NR positioning," R1-1900037, 3GPP TSG RAN WG1 Ad Hoc Meeting #1901, Taipei, Jan. 21-25, 2019, 9 pages.
Intel Corporation, "Analysis of Techniques for NR UL Positioning," R1-1900513, 3GPP TSG RAN WG1 Ad Hoc Meeting #1901, Taipei, Jan. 21-25, 2019, 17 pages.
Intel Corporation, "Summary for NR-Positioning AI—7.2.10.1.1 DL only based Positioning," R1-1901341, 3GPP TSG RAN WG1 Ad Hoc Meeting #1901, Taipei, Jan. 21-25, 2019, 6 pages.
United Kingdom Intellectual Property Office, "Search and Examination Report under Sections 17 and 18(3)", dated May 4, 2021, in connection with United Kingdom Patent Application No. 1902051.0, 6 pages.
Sony,"Considerations on Downlink based Positioning in NR", 3GPP TSG RAN WG1 Ad-Hoc Meeting 1901, R1-1900384, Taipei, Taiwan, Jan. 21-25, 2019, 7 pages.

* cited by examiner

POSITION OF USER EQUIPMENT

CROSS-REFERENCE TO RELATED APPLICATION

This application is based on and claims priority under 35 U.S.C. § 119 to United Kingdom Patent Application No. 1902051.0, filed on Feb. 14, 2019, in the United Kingdom Intellectual Property Office, and Korean Patent Application No. 10-2020-0018586, filed on Feb. 14, 2020, in the Korean Intellectual Property Office the disclosures of which are incorporated by reference herein in its entirety.

BACKGROUND

1. Field

The present disclosure relates to positioning and measurement in networks, such as cellular or telecommunication networks, for example, but not exclusively, to Fifth Generation (5G) or New Radio (NR) networks.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Demand for mobile services is growing rapidly and one of the fastest growing segments is Location Based Services (LBS), primarily driven by two major requirements: emergency services and commercial applications. In response to these needs, second and third generation networks (WCDMA, GSM, CDMA) have added support for several positioning technologies, which vary in their accuracy and Time to First Fix (TTFF) performance. 3GPP Release 9 for LTE defines support for positioning technologies: Extended Cell ID (ECID), Assisted Global Navigation Satellite System (A-GNSS), Observed Time Different Of Arrival (OT-DOA) and LTE Positioning Protocol (LPP), a new positioning protocol. A new reference signal, i.e., positioning reference signal (PRS) has been defined in LTE. Further in Release-11, Uplink Observed Time Different of Arrival (UTDOA) has been adopted using SRS measurement. 3GPP Release-15 defines support for some RAT-independent positioning techniques, such as Real Time Kinematic (RTK) GNSS, to improve the accuracy of LTE positioning.

However, there remains a need to improve an accuracy, a precision, an efficiency and/or a speed for determining the position of a user equipment, UE, to reduce a latency for determining the position of the UE and/or enable respective positions of a plurality of such UEs to be determined at higher number densities.

SUMMARY

It is one aim of the present disclosure, amongst others, to provide a method of determining a position of a user equipment, UE, in a network which at least partially obviates or mitigates at least some of the disadvantages of the prior art, whether identified herein or elsewhere. For example, the present disclosure may provide a method of determining a position of a user equipment, UE, in a network so as to improve an accuracy, a precision, an efficiency and/or a speed for determining the position, to reduce a latency for determining the position of the UE and/or enable respective positions of a plurality of such UEs to be determined at higher number densities.

According to a first aspect, there is provided a method of determining a position of a user equipment, UE, in a network, the method comprising:

measuring, via a downlink, DL, and/or an uplink, UL, a first measurement of a set of measurements; and estimating, at least in part, the position of the UE using the first measurement of the set of measurements.

According to a second aspect, there is provided a user equipment, UE, or a TRP transmission/reception point, TRP arranged to implement the method according to the first aspect.

According to a third aspect, there is provided a network comprising a UE and/or a TRP according to the second aspect.

According to a fourth aspect, there is provided a tangible non-transient computer-readable storage medium having recorded thereon instructions which when implemented by a TRP transmission/reception point, TRP, and/or a user equipment, UE, cause the TRP and/or the UE device to perform a method according to the first aspect.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a better understanding of the present disclosure, and to show how various embodiments of the same may be brought into effect, reference will be made, by way of example only, in which.

DETAILED DESCRIPTION

Figure 1:
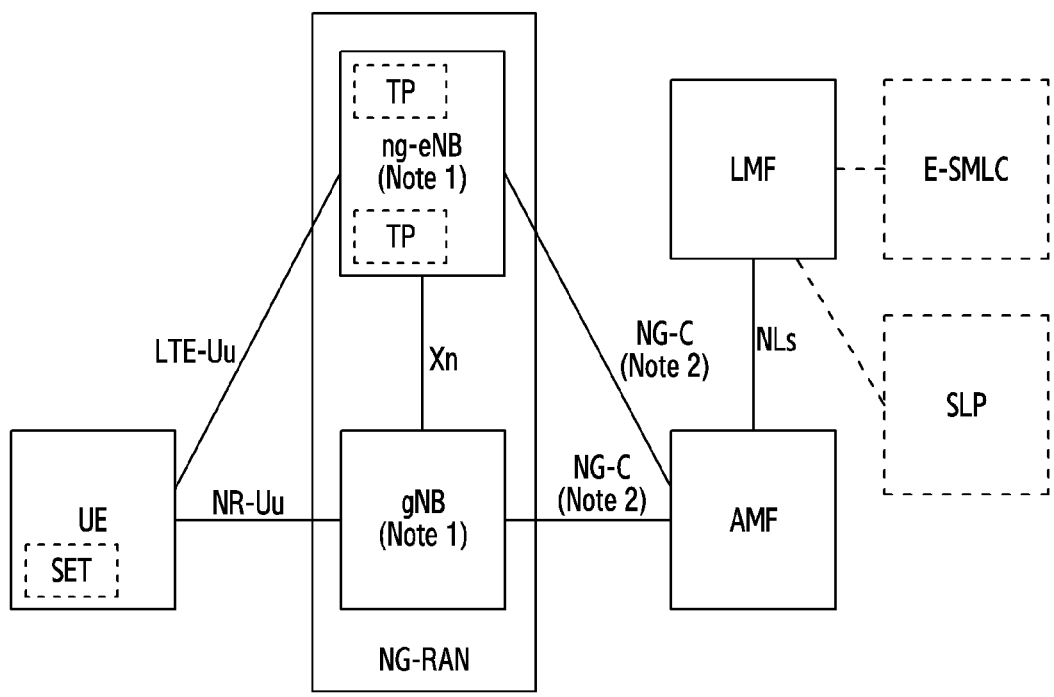
FIG. 1 schematically depicts an example of UE positioning architecture for NG-RAN.
Figure 2:
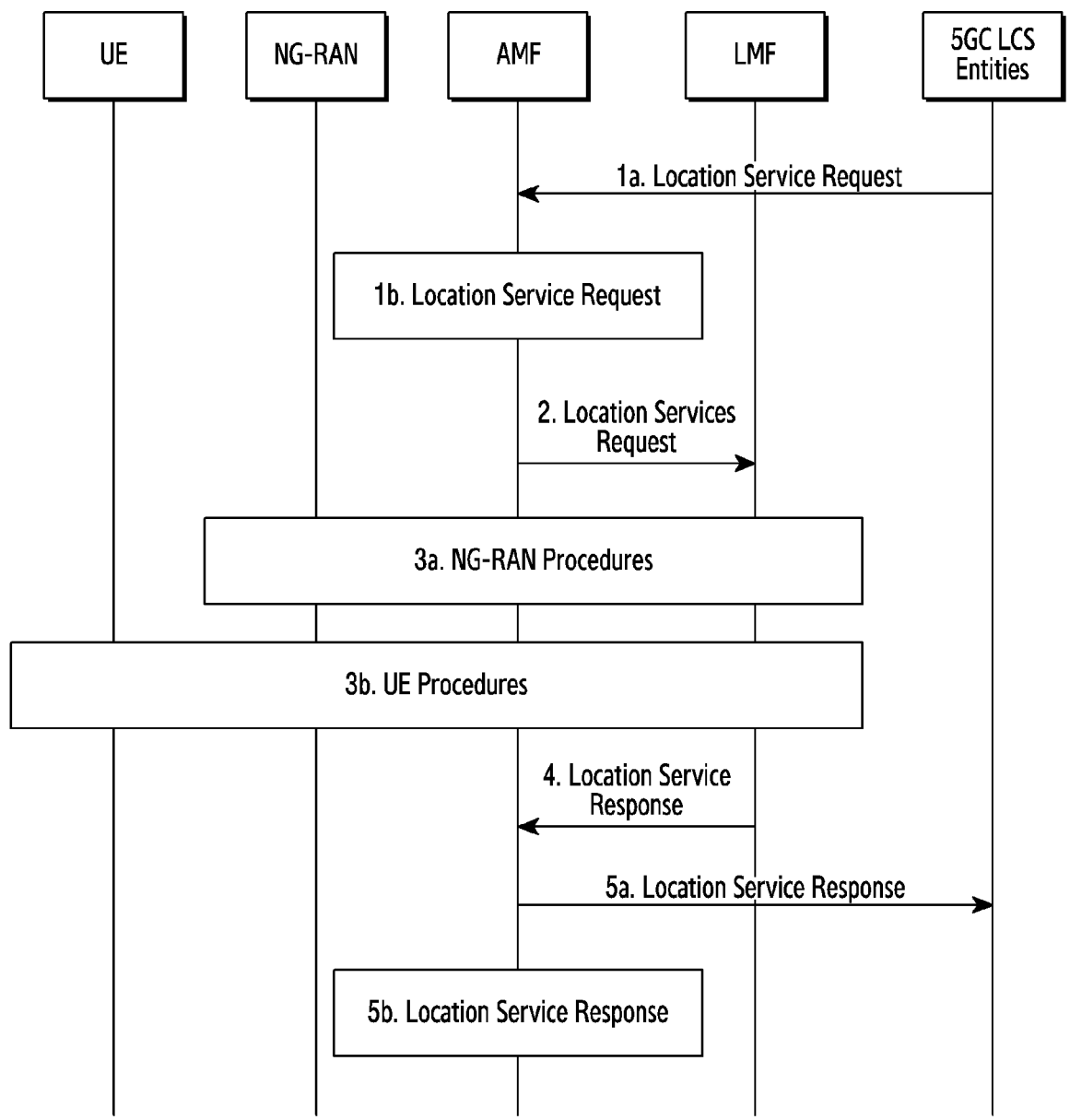
FIG. 2 schematically depicts a method of location service support for the architecture of FIG. 1.
Figure 3:
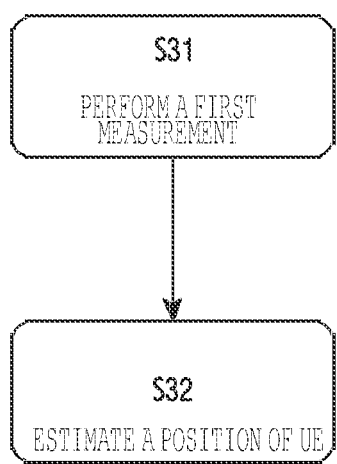
FIG. 3 schematically depicts a method according to an embodiment.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

According to the present disclosure there is provided a method of determining a position of a user equipment, UE, in a network as set forth in the appended claims. Also provided are a TRP transmission/reception point, TRP, a user equipment, UE, a network comprising a TRP and/or a UE and a computer-readable storage medium. Other features of the disclosure will be apparent from the dependent claims, and the description that follows.

Generally, terms and definitions given in 3GPP TR 21.905 apply.

Transmission/Reception Point (TRP): A set of geographically co-located transmit antennas for one cell, part of one cell or one PRS-only TRP. TRPs can include base station (ng-eNB or gNB) antennas, remote radio heads, a remote antenna of a base station, an antenna of a PRS-only TRP, etc. One cell can be formed by one or multiple transmission points. For a homogeneous deployment, each transmission point may correspond to one cell.

PRS-only TRP: A TRP which only transmits PRS signals for PRS-based TBS positioning for E-UTRA and is not associated with a cell.

Location Measurement Unit: A typical cell site will include an LMU in order to support network based location services. The LMU is responsible for taking specific radio interface measurements, typically under the control of a SMLC (Serving Mobile Location Centre).

As used in this document, the suffixes "-based" and "-assisted" refer respectively to the node that is responsible for making the positioning calculation (and which may also provide measurements) and a node that provides measurements (but which does not make the positioning calculation). Thus, an operation in which measurements are provided by the UE to the LMF to be used in the computation of a position estimate is described as "UE-assisted" (and could also be called "LMF-based"), while one in which the UE computes its own position is described as "UE-based".

Generally, in Universal Mobile Telecommunications System (UMTS) and 3GPP Long Term Evolution (LTE), UE devices allow users to access network services. In other words, a UE device is any device used by a user to communicate on a network. The UE device may be, for example, a device comprising a transmitter and a receiver or a transceiver, such as a mobile telephone or a laptop computer equipped with a mobile broadband adapter. The user may be a human user or a non-human user, for example a vehicle or infrastructure. The UE device may connect to or communicate with or via an access point (AP) for example a Universal Terrestrial Radio Access Network (UTRAN) access point such as a base station Node B (Node B or NB) and/or an evolved base station Node B (eNodeB or eNB and/or a gNodeB (gNB). That is, the UE device may transmit data to and/or receive data from the access point, as described below. Furthermore, the device may connect to or communicate with or via another such UE device.

The TRP comprises and/or is an access point, for example a UTRAN access point. It should be understood that an UTRAN access point may be a conceptual point within the UTRAN performing radio transmission and reception. The UTRAN access point may be associated with one specific cell. That is, there may exist one UTRAN access point, for example a TRP, for each cell. The UTRAN access point may be the UTRAN-side end point of a radio link. In other words, the TRP may define a cell.

It should be understood that a cell may be a radio network object that may be uniquely identified by the UE device from a cell identification that is broadcast over a geographical area from one UTRAN access point. A cell may be in either Frequency Division Duplex (FDD) or Time Division Duplex (TDD) mode.

It should be understood that a sector may be a sub-area of a cell. All sectors within the cell may be served by the same access point. A radio link within the sector may be identified by a single logical identification belonging to the sector.

NR seeks to minimize always-on transmissions to enhance network energy efficiency and provide forward compatibility. In contrast to LTE, reference signals in NR are transmitted only when necessary. The four main reference signals are the demodulation reference signal (DMRS), phase-tracking reference signal (PTRS), sounding reference signal (SRS) and channel-state information reference signal (CSI-RS).

DMRS is used to estimate the radio channel for demodulation. DMRS is UE device-specific, may be beamformed, confined in a scheduled resource block, and transmitted only when necessary, both in downlink (DL) and uplink (UL). To support multiple-layer multiple input, multiple output (MIMO) transmission, multiple orthogonal DMRS ports may be scheduled, one for each layer. Orthogonality is achieved by frequency division multiplexing (FDM), time division multiplexing (TDM) and code division multiplexing (CDM). For low-speed scenarios, DMRS uses low density in the time domain. However, for high-speed scenarios, the time density of DMRS is increased to track fast changes in the radio channel.

As described previously, phase tracking reference signals (PTRS) were introduced in New Radio (NR) to enable compensation of oscillator phase noise. Typically, phase noise increases as a function of oscillator carrier frequency. A degradation caused by phase noise in an orthogonal frequency-division multiplexing (OFDM) signal is an identical phase rotation of all the subcarriers, known as common phase error (CPE). PTRS may be used at high carrier frequencies (such as mmWave) to mitigate phase noise. PTRS has low density in the frequency domain and high density in the time domain, since the phase rotation produced by CPE is identical for all subcarriers within an OFDM symbol. PTRS is user equipment (UE) device-specific, confined in a scheduled resource block (RB) and may be beamformed. The number of PTRS ports may be lower than the total number of DMRS ports, and orthogonality between PTRS ports is achieved by means of FDM. PTRS is configurable depending on the quality of the oscillators, allocated BW, carrier frequency, OFDM subcarrier spacing, and modulation and coding schemes used for transmission.

The SRS is transmitted in UL to perform CSI measurements mainly for scheduling and link adaptation. For NR, SRS may be used for reciprocity-based precoder design for massive MIMO and UL beam management. The approach for CSI-RS is similar.

According to a first aspect, there is provided a method of determining a position (i.e. a geographic position) of a user equipment, UE, in a network, the method comprising:

measuring, via a downlink, DL, and/or an uplink, UL, a first measurement of a set of measurements; and estimating, at least in part, the position of the UE using the first measurement of the set of measurements.

In this way, the position of the UE may be estimated with improved accuracy, precision, efficiency and/or speed, with reduced latency and/or enable respective positions of a plurality of such UEs to be determined at higher number densities, compared with conventional methods of position determination.

Generally, positioning functionality provides a means a determine a geographic position and/or a velocity of the UE, based on measuring radio signals. The position information may be requested by and reported to a client (e.g. an application) associated with the UE, or by a client within or attached to the core network. The position information may be reported in standard formats, such as those for cell-based or geographical co-ordinates, together with the estimated errors (uncertainty) of the position and velocity of the UE and, if available, the positioning method (or the list of the methods) used to obtain the position estimate.

Generally, it should be possible for the majority of the UEs within a network to use the LCS feature without compromising the radio transmission or signaling capabilities of the NG-RAN.

An uncertainty of the position measurement may be network-implementation-dependent, for example at the choice of the network operator. The uncertainty may vary between networks as well as from one area within a network to another. The uncertainty may be hundreds of meters in some areas and only a few meters in others. In the event that a particular position measurement is provided through a UE-assisted process, the uncertainty may also depend on the capabilities of the UE.

The uncertainty of the position information may be dependent on the method used, the position of the UE within the coverage area and/or the activity of the UE. Several design options of the NG-RAN system (e.g., size of cell, adaptive antenna technique, pathloss estimation, timing accuracy, ng-eNB and gNB surveys) may allow the network operator to choose a suitable and cost-effective UE positioning method for their market.

There are many different possible uses for the positioning information. The positioning functions may be used internally by the 5GS, by value-added network services, by the UE itself or through the network, and by "third party" services. The feature may also be used by an emergency service (which may be mandated or "value-added"), but the location service is not exclusively for emergencies.

Generally, for UE positioning in NG-RAN, the following assumptions apply:

a. both TDD and FDD will be supported;

b. the provision of the UE Positioning function in NG-RAN and 5GC is optional through support of the specified method(s) in the ng-eNB, gNB and the LMF;

c. UE Positioning is applicable to any target UE, whether or not the UE supports LCS, but with restrictions on the use of certain positioning methods depending on UE capability (e.g. as defined within the LPP protocol);

d. the positioning information may be used for internal system operations to improve system performance;

e. the UE Positioning architecture and functions shall include the option to accommodate several techniques of measurement and processing to provide evolution to follow changing service requirements and to take advantage of advancing technology.

Generally, determining the position of the UE involves two main steps:

A. signal measurement; and

B. position estimation and optional velocity computation based on the measurements.

Generally, the signal measurements may be made by the UE or by the serving ng-eNB or gNB. The basic signals measured for terrestrial position methods are typically the LTE radio transmissions; however, other methods may make use of other transmissions such as general radio navigation signals including those from Global Navigation Satellites Systems (GNSSs).

Generally, the position estimation and optional velocity computation may be made by the UE and/or by the LMF, for example by the network such as a TRP in the network. For example, the position estimation and optional velocity computation can be performed by a processor or controller in the UE.

In one example, the measuring is by (i.e. performed by) the UE. In one example, the measuring is by the network, for example a TRP transmission/reception point, TRP, a gNB, or a LMU, for example co-located with the gNB, in the network. For example, if the measuring is via the DL, the measuring may be by the UE and/or the network, for example a TRP transmission/reception point, TRP, or a gNB in the network. For example, the UE may perform the measuring and provide the first measurement and/or the set of measurements to the network, for example a TRP or a gNB, for the estimating thereby. Additionally and/or alternatively, the UE may perform the measuring and the estimating. Subsequently, the UE may provide the estimated position to the network, for example a TRP or a gNB. For example, if the measuring is via the UL, the measuring may be performed by the network, for example a TRP transmission/reception point, TRP, a gNB and/or a LMU, for example co-located with the gNB, in the network. The network may provide the first measurement and/or the set of measurements thereto and/or to the UE.

In one example, the estimating is by (i.e. performed by) the UE. In one example, the estimating is by the network, for example a TRP transmission/reception point, TRP, or a gNB in the network. In one example, the estimating is by the UE and by the network, for example a TRP transmission/reception point, TRP, or a gNB in the network.

Described herein are specific methods of measuring via the DL and the UL, as itemized here and as listed below:

Measuring Via DL
1. RSTD between a neighbor TRX and a reference TRP
2. RSTD between a first beam and a reference beam
3. RSTD between a first PRS resource and a reference PRS resource
4. RSRP
5. SINR Measuring Via UL
6. RTOA of SRS
7. PRS-RSRP
8. gNB Rx-Tx time difference
9. UE Rx-Rx time difference It should be understood that these specific methods of measuring are not mutually exclusive. That is, one or more of these specific methods of measuring may be performed, for example simultaneously and/or successively, by the UE and/or by the network, for example a TRP or gNB therein. In other words, hybrid positioning using multiple of these methods is supported. Particularly, any two or more of these specific methods of measuring may be combined. For example, measuring may be via the DL and/or via the UL, while two or more of the specific methods of measuring via the DL and/or via the UL may also be combined. Furthermore, measuring the first measurement of the set of measurements for these specific methods may be measuring the Nth measurement of the set of measurements, where N refers respectively to the respective specific methods 1 to 9 above, notwithstanding that the specific methods may be ordered in any order. In this way, an accuracy, a precision, an efficiency and/or a speed for determining the position may be further improved, a latency for determining the position of the UE further reduced and/or respective positions of a plurality of such UEs to be determined at higher number densities further enabled. Furthermore, these specific methods may be additionally and/or alternatively combined with conventional methods of position determination, such as network-assisted GNSS methods, observed time difference of arrival (OTDOA) positioning, enhanced cell ID methods, barometric pressure sensor positioning, WLAN positioning, Bluetooth® positioning and/or terrestrial beacon system (TBS) positioning, thereby further supporting hybrid methods of positioning.

Measuring via DL: RSTD Between a Neighbor TRX and a Reference TRP

In one example, measuring the first measurement comprises measuring, via the DL, a first reference signal time difference, RSTD, between a neighbor TRP transmission/reception point, TRP, and a reference TRP.

That is, the first RSTD may be defined with respect to TRPs/gNBs.

It should be understood that the first measurement is thus the first RSTD. In one example, the neighbor TRP is the TRP most proximal to the UE. In one example, the reference TRP is a predetermined TRP, for example predetermined for the network and/or for the neighbor TRP. It should be understood that the neighbor TRP and/or the reference TRP may be respectively a neighbor gNB and/or a reference gNB.

In one example, the relative timing difference (i.e. the first RSTD) between the neighbor gNB/TRP j and the reference gNB/TRP i is defined as:

$$T_{SubframeRxj} - T_{SubframeRxi}$$

where:

$T_{subframeRxj}$ is the time when the UE receives the start of one subframe from cell j; and $T_{subframeRxi}$ is the time when the UE receives the corresponding start of one subframe from cell i that is closest in time to the subframe received from cell j.

In one example, for frequency range 1 (FR1), a reference point for the observed subframe time difference is an antenna connector of the UE.

It should be understood that the reference point, as described generally herein, is the point in the radio frequency, RF, chain where the measurement is performed. Generally, in a radio receiver circuit, the RF front end is a generic term for all the circuitry between a receiver's antenna input up to and including the mixer stage.

In one example, for frequency range 2 (FR2), the reference point for the observed subframe time difference is measured based on a combined signal from antenna elements, for example of the UE, corresponding to a given (i.e. predetermined) receiver (Rx) branch.

Measuring Via DL: RSTD Between a First Beam and a Reference Beam

In one example, measuring the first measurement comprises measuring, via the DL, a second reference signal time difference, RSTD, between a first beam and a reference beam, optionally wherein the first beam and the reference beam are associated with (for example, belong to, transmitted by) the same or different TRPs.

That is, the second RSTD may be defined with respect to beams.

In one example, the relative timing difference (i.e. the second RSTD) between the first beam j and the reference beam i is defined as:

$$T_{SubframeRxj} - T_{SubframeRxi}$$

where:

$T_{SubframeRxj}$ is the time when the UE receives the start of one subframe from beam j; and $T_{subframeRxi}$ is the time when the UE receives the corresponding start of one subframe from beam i that is closest in time to the subframe received from beam j.

In one example, for frequency range 1 (FR1), the reference point for the observed subframe time difference is the antenna connector of the UE.

In one example, for frequency range 2 (FR2), the reference point for the observed subframe time difference is measured based on the combined signal from antenna elements corresponding, for example of the UE, to a given (i.e. predetermined) receiver branch.

Measuring Via DL: RSTD Between a First PRS Resource and a Reference PRS Resource In one example, measuring the first measurement comprises measuring, via the DL, a third reference signal time difference, RSTD, between a first positioning reference signal, PRS, resource of a set of PRS resources and a reference PRS resource of a set of reference PRS resources.

In one example, measuring the first measurement comprises measuring, via the DL, a fourth reference signal time difference, RSTD, between a first positioning reference signal, PRS, resource set and a reference PRS resource set.

That is, the third RSTD may be defined with respect to PRS resources and/or resource sets.

In one example, the relative timing difference (i.e. the third RSTD) between the first PRS resource and/or resource set j and the reference PRS resource and/or resource set i is defined as:

$$T_{SubframeRxj} - T_{SubframeRxi}$$

where:

$T_{SubframeRxj}$ is the time when the UE receives the start of one subframe from the first PRS resource and/or resource set j; and $T_{SubframeRxi}$ is the time when the UE receives the corresponding start of one subframe from the first PRS resource and/or resource set i that is closest in time to the subframe received from PRS resource and/or resource set j.

In one example, for frequency range 1 (FR1), the reference point for the observed subframe time difference is the antenna connector of the UE.

In one example, for frequency range 2 (FR2), the reference point for the observed subframe time difference is measured based on the combined signal from antenna elements, for example of the UE, corresponding to a given (i.e. predetermined) receiver branch.

Measuring Via DL: RSRP

In one example, measuring the first measurement comprises measuring, via the DL, a positioning reference signal, PRS, reference signal received power, RSRP.

In one example, the PRS reference signal received power (PRS-RSRP) is defined as the linear average over power contributions (in [W]) of resource elements of antenna port(s) of the UE that carry PRS reference signals configured for RSRP measurements within the considered measurement frequency bandwidth in the configured PRS occasions.

In one example, PRS reference signals transmitted on a specific antenna port i are used for measuring the PRS-RSRP.

In one example, if PRS-RSRP is used for L1-RSRP, the PRS transmitted on one or more specific antenna ports i, j is used for PRS-RSRP determination.

In one example, for intra-frequency PRS-RSRP measurements, if a measurement gap is not configured, the UE constrains the measuring of the PRS resource(s) within the active downlink bandwidth part.

In one example, for frequency range 1 (FR1), the reference point for the PRS-RSRP is the antenna connector of the UE.

In one example, for frequency range 2 (FR2), the PRS-RSRP is measured based on the combined signal from antenna elements, for example of the UE, corresponding to a given (i.e. predetermined) receiver branch.

Measuring Via DL: SINR

In one example, measuring the first measurement comprises measuring, via the DL, a positioning reference signal, PRS, signal-to-noise and interference ration, SINR.

In one example, the PRS signal-to-noise and interference ratio (PRS-SINR), is defined as a linear average over a power contribution (in [W]) of resource elements carrying PRS reference signals divided by a linear average of a noise and interference power contribution (in [W]) over the resource elements carrying PRS reference signals within the same frequency bandwidth.

In one example, PRSs transmitted on a specific antenna port shall be used for the PRS-SINR determination.

In one example, the UE constrains measuring of the PRS resource(s) within the active downlink bandwidth part.

In one example, for frequency range 1 (FR1), the reference point for the PRS-SINR is the antenna connector of the UE.

In one example, for frequency range 2 (FR2), the PRS-SINR is measured based on a combined signal from antenna elements, for example of the UE, corresponding to a given (i.e. predetermined) receiver branch.

Measuring Via UL: RTOA of SRS

In one example, measuring the first measurement comprises measuring, via the UL, a relative time of arrival, RTOA, of a sounding reference signal, SRS.

Generally, OTDOA positioning methods makes use of the measured timing of downlink signals received from multiple TRPs, comprising eNBs, ng-eNBs and PRS-only TRPs, at the UE. The UE measures the timing of the received signals using assistance data received from the positioning server, and the resulting measurements are used to locate the UE in relation to the neighboring TRPs.

In contrast, in this example, the first measurement comprises measuring, via the UL, the RTOA of the SRS.

In one example, the UL Relative Time of Arrival (RTOA) TUL-RTOA is the beginning of subframe i containing the SRS received in TRP/gNB/LMU j, relative to a configurable reference time, which may be configured by upper layers, for example.

In one example, the reference point for the UL relative time of arrival RTOA is the RX antenna connector of the TRP/gNB/LMU node if a location measurement unit (LMU) has a separate RX antenna or shares a RX antenna with a gNB/TRP. In one example, the reference point for the UL relative time of arrival RTOA is the gNB/TRP antenna connector if a LMU is integrated in gNB/TRP.

Measuring Via UL: PRS-RSRP

In one example, measuring the first measurement comprises measuring, via the UL, a positioning reference signal, PRS, reference signal received power, RSRP (also known as UL PRS-PSRP).

In one example, the UL PRS (for example, SRS) reference signal received power (UL PRS-RSRP), is defined as the linear average over the power contributions (in [W]) of the resource elements of the antenna port(s) that carry UL PRS configured for RSRP measurements within the considered measurement frequency bandwidth in the configured UL PRS occasions.

In one example, for UL PRS-RSRP determination, PRS reference signals transmitted on a specific antenna port i shall be used.

In one example, if the UL PRS-RSRP is used for L1-RSRP, the UL PRS transmitted on one or more specific antenna ports i, j is used for UL PRS-RSRP determination.

In one example, for frequency range 1 (FR1), the reference point for the UL PRS-RSRP is an antenna connector of a, for example receiving, TRP or gNB in the network.

In one example, for frequency range 2 (FR2), the UL PRS-RSRP is measured based on a combined signal from antenna elements corresponding to a given receiver branch of a, for example receiving, TRP or gNB in the network.

Measuring Via UL: Rx-Tx Time Difference

In one example, measuring the first measurement comprises measuring, via the UL, a g node B, gNB, receive-transmit (Rx-Tx) time difference.

In one example, the gNB Rx-Tx time difference k is defined as:

$$T_{gNB-RX,k} - T_{gNB-TX}$$

where:

$T_{gNB-RX,k}$ is the k-th gNB received timing of uplink radio frame #i, defined by the first or the strongest detected path in time.

In one example, for frequency range 1 (FR1), the reference point for TgNB-RX,k is the Rx antenna connector.

In one example, for frequency range 2 (FR2), the reference point for TgNB-RX,k is the combined signal from antenna elements corresponding to a given receiver branch.

In one example, $T_{gNB-TX,k}$ is the k-th gNB transmit timing of downlink radio frame #i.

In one example, for frequency range 1 (FR1), the reference point for $T_{gNB-TX,k}$ is the Tx antenna connector, for example of the UE.

In one example, for frequency range 2 (FR2), the reference point for $T_{gNB-TX,k}$ is the combined signal from antenna elements corresponding to a given transmission branch, for example of a TRP or a gNB.

Measuring Via UL: UE Rx-Rx Time Difference

In one example, measuring the first measurement comprises measuring, via the UL, a UE receive-transmit (Rx-Tx) time difference.

In one example, the UE Rx-Tx time difference k is defined as:

$$T_{UE-RX,k} - T_{UE-TX}$$

where:

$T_{UE-RX,k}$ is the UE received timing of downlink radio frame #i from the k-th gNB, defined by the first or the strongest detected path in time.

In one example, for frequency range 1 (FR1), the reference point for $T_{UE-RX,k}$ shall be the Rx antenna connector of the UE.

In one example, for frequency range 2 (FR2), the reference point for $T_{gNB-RX,k}$ shall be the combined signal from antenna elements corresponding to a given receiver branch of the UE.

In one example, $T_{UE-TX,k}$ is the transmit timing of uplink radio frame #i to the k-th gNB.

In one example, for frequency range 1 (FR1), the reference point for $T_{UE-TX,k}$ is the Tx antenna connector of the UE.

In one example, for frequency range 2 (FR2), the reference point for $T_{UE-TX,k}$ is the combined signal from antenna elements corresponding to a given transmission branch of the UE.

Quality Metrics

In one example, the method comprises determining a quality metric for a reference signal time difference, RSTD, a UE receive-transmit time difference and/or a reference signal time difference, RTOA, optionally using a reference signal received power, RSRP.

In one example, the method comprises determining the quality metric for the reference signal time difference, RTOA, using the reference signal received power, RSRP.

In one example, the method comprises determining the quality metric for the UE receive-transmit time difference, using the reference signal received power, RSRP.

In one example, the method comprises determining the quality metric using an UL RSRP, for example for NR UL PRS.

In one example, the method comprises reporting the quality metric.

In one example, the quality metric (for example, a PRS-RSRP quality metric) is always reported.

In one example, the quality metric is derived from other signals, for example a SS-RSRP.

In one example, the quality metric is reported when necessary, for example based on a triggering mechanism, and/or configured by upper layers, for example LPP/RRC/MAC CE.

In one example, the triggering mechanism comprises and/or is a low signal reception strength and/or an accuracy error.

In one example, a periodicity of the reporting is the same or different from a PRS periodicity, for example K times the PRS periodicity, where K is configured by upper layers, for example LPP/RRC/MAC CE.

According to the second aspect, there is provided a user equipment, UE, or a TRP transmission/reception point, TRP (or gNB) arranged to implement the method according to the first aspect.

According to the third aspect, there is provided a network comprising a UE and/or a TRP according to the third aspect.

In one example, an architecture of the network is as described in ETSI TS 138 305 V15.1.0 (2018-10).

According to the fourth aspect, there is provided a tangible non-transient computer-readable storage medium having recorded thereon instructions which when implemented by a TRP transmission/reception point, TRP, and/or a user equipment, UE, cause the TRP and/or the UE device to perform a method according to the first aspect.

Throughout this specification, the term "comprising" or "comprises" means including the component(s), unit(s), module(s), feature(s) or integer(s) specified but not to the exclusion of the presence of other components, units, modules, features or integers.

The term "consisting of" or "consists of" means including the component(s), unit(s), module(s), feature(s) or integer(s) specified but excluding other components, units, modules, features or integers.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or embodiment of the disclosure, as set out herein are also applicable to all other aspects or various embodiments of the disclosure, where appropriate. In other words, the skilled person reading this specification should consider the optional features for each aspect or embodiment of the disclosure as interchangeable and combinable between different aspects and various embodiments.

FIG. 1 schematically depicts an example of UE positioning architecture for NG-RAN.

The UE may make measurements of downlink signals from NG-RAN and other sources such as E-UTRAN, different GNSS and TBS systems, WLAN access points, Bluetooth beacons, and UE barometric sensors. The measurements to be made will be determined by the chosen positioning method. Furthermore, the gNB may make such measurements of downlink and uplink signals, mutatis mutandis.

The UE may also contain LCS applications, or access an LCS application either through communication with a network accessed by the UE or through another application residing in the UE. This LCS application may include the needed measurement and calculation functions to determine the UE's position with or without network assistance. The UE may also, for example, contain an independent positioning function (e.g. GPS) and thus be able to report its position, independent of the NG-RAN transmissions. The UE with an independent positioning function may also make use of assistance information obtained from the network.

The gNB is a network element of NG-RAN that may provide measurement information for a target UE and communicates this information to an LMF.

The ng-eNB is a network element of NG-RAN that may provide measurement results for position estimation and makes measurements of radio signals for a target UE and communicates these measurements to an LMF.

The ng-eNB makes its measurements in response to requests from the LMF (on demand or periodically).

An ng-eNB may serve several TRPs, including for example remote radio heads and PRS-only TRPs for PRS-based TBS positioning for E-UTRA.

The LMF manages the support of different location services for target UEs, including positioning of UEs and delivery of assistance data to UEs. The LMF may interact with the serving gNB or serving ng-eNB for a target UE in order to obtain position measurements for the UE, including uplink measurements made by an ng-eNB and downlink measurements made by the UE that were provided to an ng-eNB as part of other functions such as for support of handover.

The LMF may interact with a target UE in order to deliver assistance data if requested for a particular location service, or to obtain a location estimate if that was requested.

For positioning of a target UE, the LMF decides on the position methods to be used, based on factors that may include the LCS Client type, the required QoS, UE positioning capabilities, gNB positioning capabilities and ng-eNB positioning capabilities. The LMF then invokes these positioning methods in the UE, serving gNB and/or serving ng-eNB. The positioning methods may yield a location estimate for UE-based position methods and/or positioning measurements for UE-assisted and network-based position methods. The LMF may combine all the received results and determine a single location estimate for the target UE (hybrid positioning). Additional information like accuracy of the location estimate and velocity may also be determined.

Note 1: The gNB and ng-eNB may not always both be present.

Note 2: When both the gNB and ng-eNB are present, the NG-C interface may only present for one of them.

FIG. 2 schematically depicts a method of location service support for the architecture of FIG. 1.

Generally, to support positioning of a target UE and delivery of location assistance data to a UE with NG-RAN access in 5GS, location related functions are distributed as shown in the architecture in FIG. 1, as detailed in TS 23.501. The overall sequence of events applicable to the UE, NG-RAN and LMF for any location service is shown in FIG. 2.

Note that when the AMF receives a Location Service Request in case of the UE is in CM-IDLE state, the AMF performs a network triggered service request as defined in TS 23.502 in order to establish a signaling connection with the UE and assign a specific serving gNB or ng-eNB. The UE is assumed to be in connected mode before the beginning of the flow shown in the FIG. 2 that is, any signaling that might be used to bring the UE to connected mode prior to step 1a is not shown. The signaling connection may, however, be later released (e.g. by the NG-RAN as a result of signaling and data inactivity) while positioning is still ongoing.

1a. Either: some entity in the 5GC (e.g. GMLC) requests some location service (e.g. positioning) for a target UE to the serving AMF.

1b. Or: the serving AMF for a target UE determines the need for some location service (e.g. to locate the UE for an emergency call).

2. The AMF transfers the location service request to an LMF.

3a. The LMF instigates location procedures with the serving ng-eNB or gNB in the NG-RAN—e.g. to obtain positioning measurements or assistance data.

3b. In addition to step 3a or instead of step 3a, for downlink positioning the LMF instigates location procedures with the UE—e.g. to obtain a location estimate or positioning measurements or to transfer location assistance data to the UE.

4. The LMF provides a location service response to the AMF and includes any needed results—e.g. success or failure indication and, if requested and obtained, a location estimate for the UE.

5a. If step 1a was performed, the AMF returns a location service response to the 5GC entity in step 1a and includes any needed results—e.g. a location estimate for the UE.

5b. If step 1b occurred, the AMF uses the location service response received in step 4 to assist the service that triggered this in step 1b (e.g. may provide a location estimate associated with an emergency call to a GMLC).

Location procedures applicable to NG-RAN occur in steps 3a and 3b in FIG. 5.2-1 and are defined in greater detail in this specification. Other steps in FIG. 2 are generally applicable to the 5GC and are described in greater detail and in TS 23.502.

Steps 3a and 3b can involve the use of different position methods to obtain location related measurements for a target UE and from these compute a location estimate and possibly additional information like velocity.

FIG. 3 schematically depicts a method according to an embodiment.

The method is of determining a position of a user equipment, UE, in a network.

At S31, a first measurement of a set of measurements is measured, via a downlink, DL, and/or an uplink, UL.

At S32, the position of the UE is estimated, at least in part, using the first measurement of the set of measurements.

The measuring of the first measurement may be as described below with respect to one or more of Examples 1 to 9.

Measuring via DL: RSTD Between a Neighbor TRX and a Reference TRP

In this example, measuring the first measurement comprises measuring, via the DL, a first reference signal time difference, RSTD, between a neighbor TRP transmission/reception point, TRP, and a reference TRP.

In this example, the relative timing difference (i.e. the first RSTD) between the neighbor gNB/TRP j and the reference gNB/TRP i is defined as:

$$T_{SubframeRxj} - T_{SubframeRxi}$$

where:

$T_{SubframeRxj}$ is the time when the UE receives the start of one subframe from cell j; and $T_{SubframeRxi}$ is the time when the UE receives the corresponding start of one subframe from cell i that is closest in time to the subframe received from cell j.

In this example, for frequency range 1 (FR1), the reference point for the observed subframe time difference is an antenna connector of the UE.

In this example, for frequency range 2 (FR2), the reference point for the observed subframe time difference is measured based on a combined signal from antenna elements, for example of the UE, corresponding to a given (i.e. predetermined) receiver (Rx) branch.

Measuring Via DL: RSTD Between a First Beam and a Reference Beam

In this example, measuring the first measurement comprises measuring, via the DL, a second reference signal time difference, RSTD, between a first beam and a reference beam.

That is, the second RSTD may be defined with respect to beams.

In this example, the relative timing difference (i.e. the second RSTD) between the first beam j and the reference beam i is defined as:

$$T_{SubframeRxj} - T_{SubframeRxi}$$

where:

$T_{SubframeRxj}$ is the time when the UE receives the start of one subframe from beam j; and $T_{SubframeRxi}$ is the time when the UE receives the corresponding start of one subframe from beam i that is closest in time to the subframe received from beam j.

In this example, for frequency range 1 (FR1), the reference point for the observed subframe time difference is the antenna connector of the UE.

In this example, for frequency range 2 (FR2), the reference point for the observed subframe time difference is measured based on the combined signal from antenna elements corresponding, for example of the UE, to a given (i.e. predetermined) receiver branch.

Measuring Via DL: RSTD Between a First PRS Resource and a Reference PRS Resource In this example, measuring the first measurement comprises measuring, via the DL, a third reference signal time difference, RSTD, between a first positioning reference signal, PRS, resource of a set of PRS resources and a reference PRS resource of a set of reference PRS resources.

That is, the third RSTD may be defined with respect to PRS resources.

In this example, the relative timing difference (i.e. the third RSTD) between the first PRS resource and/or resource set j and the reference PRS resource and/or resource set i is defined as:

$$T_{SubframeRxj} - T_{SubframeRxi}$$

where:

$T_{SubframeRxj}$ is the time when the UE receives the start of one subframe from the first PRS resource and/or resource set j; and $T_{SubframeRxi}$ is the time when the UE receives the corresponding start of one subframe from the first PRS resource and/or resource set i that is closest in time to the subframe received from PRS resource and/or resource set j.

In this example, for frequency range 1 (FR1), the reference point for the observed subframe time difference is the antenna connector of the UE.

In this example, for frequency range 2 (FR2), the reference point for the observed subframe time difference is measured based on the combined signal from antenna elements, for example of the UE, corresponding to a given (i.e. predetermined) receiver branch.

Measuring Via DL: RSRP

In this example, measuring the first measurement comprises measuring, via the DL, a positioning reference signal, PRS, reference signal received power, RSRP.

In this example, the PRS reference signal received power (PRS-RSRP) is defined as the linear average over power contributions (in [W]) of resource elements of antenna port(s) of the UE that carry PRS reference signals configured for RSRP measurements within the considered measurement frequency bandwidth in the configured PRS occasions.

In this example, PRS reference signals transmitted on a specific antenna port i are used for measuring the PRS-RSRP.

In this example, if PRS-RSRP is used for L11-RSRP, the PRS transmitted on one or more specific antenna ports i, j is used for PRS-RSRP determination.

In this example, for intra-frequency PRS-RSRP measurements, if a measurement gap is not configured, the UE constrains the measuring of the PRS resource(s) within the active downlink bandwidth part.

In this example, for frequency range 1 (FR1), the reference point for the PRS-RSRP is the antenna connector of the UE.

In this example, for frequency range 2 (FR2), the PRS-RSRP is measured based on the combined signal from antenna elements, for example of the UE, corresponding to a given (i.e. predetermined) receiver branch.

Measuring via DL: SINR

In this example, measuring the first measurement comprises measuring, via the DL, a positioning reference signal, PRS, signal-to-noise and interference ration, SINR.

In this example, the PRS signal-to-noise and interference ratio (PRS-SINR), is defined as a linear average over a power contribution (in [W]) of resource elements carrying PRS reference signals divided by a linear average of a noise and interference power contribution (in [W]) over the resource elements carrying PRS reference signals within the same frequency bandwidth.

In this example, PRSs transmitted on a specific antenna port shall be used for the PRS-SINR determination.

In this example, the UE constrains measuring of the PRS resource(s) within the active downlink bandwidth part.

In this example, for frequency range 1 (FR1), the reference point for the PRS-SINR is the antenna connector of the UE.

In this example, for frequency range 2 (FR2), the PRS-SINR is measured based on a combined signal from antenna elements, for example of the UE, corresponding to a given (i.e. predetermined) receiver branch.

Measuring Via UL: RTOA of SRS

In this example, measuring the first measurement comprises measuring, via the UL, a relative time of arrival, RTOA, of a sounding reference signal, SRS.

Generally, OTDOA positioning methods makes use of the measured timing of downlink signals received from multiple TRPs, comprising eNBs, ng-eNBs and PRS-only TRPs, at the UE. The UE measures the timing of the received signals using assistance data received from the positioning server, and the resulting measurements are used to locate the UE in relation to the neighboring TRPs.

In contrast, in this example, the first measurement comprises measuring, via the UL, the RTOA of the SRS.

In this example, the UL Relative Time of Arrival (RTOA) TUL-RTOA is the beginning of subframe i containing the SRS received in TRP/gNB/LMU j, relative to a configurable reference time.

In this example, the reference point for the UL relative time of arrival RTOA is the RX antenna connector of the TRP/gNB/LMU node if a location measurement unit (LMU) has a separate RX antenna or shares a RX antenna with a gNB/TRP. In this example, the reference point for the UL relative time of arrival RTOA is the gNB/TRP antenna connector if a LMU is integrated in gNB/TRP.

Measuring Via DL: PRS-RSRP

In this example, measuring the first measurement comprises measuring, via the UL, a positioning reference signal, PRS, reference signal received power, RSRP (also known as UL PRS-PSRP).

In this example, the UL PRS (for example, SRS) reference signal received power (UL PRS-RSRP), is defined as the linear average over the power contributions (in [W]) of the resource elements of the antenna port(s) that carry UL PRS configured for RSRP measurements within the considered measurement frequency bandwidth in the configured UL PRS occasions.

In this example, for UL PRS-RSRP determination, PRS reference signals transmitted on a specific antenna port i shall be used.

In this example, if the UL PRS-RSRP is used for L1l-RSRP, the UL PRS transmitted on one or more specific antenna ports i, j is used for UL PRS-RSRP determination.

In this example, for frequency range 1 (FR1), the reference point for the UL PRS-RSRP is an antenna connector of a, for example receiving, TRP or gNB in the network.

In this example, for frequency range 2 (FR2), the UL PRS-RSRP is measured based on a combined signal from antenna elements corresponding to a given receiver branch of a, for example receiving, TRP or gNB in the network.

Measuring Via DL: gNB Rx-Tx Time Difference

In this example, measuring the first measurement comprises measuring, via the UL, a g node B, gNB, receive-transmit (Rx-Tx) time difference.

In this example, the gNB Rx-Tx time difference k is defined as:

$$T_{gNB-RX,k} - T_{gNB-TX}$$

where:

$T_{gNB-RX,k}$ is the k-th gNB received timing of uplink radio frame #i, defined by the first or the strongest detected path in time.

In this example, for frequency range 1 (FR1), the reference point for $T_{gNB-RX,k}$ is the Rx antenna connector.

In this example, for frequency range 2 (FR2), the reference point for $T_{gNB-RX,k}$ is the combined signal from antenna elements corresponding to a given receiver branch.

In this example, $T_{gNB-TX,k}$ is the k-th gNB transmit timing of downlink radio frame #i.

In this example, for frequency range 1 (FR1), the reference point for $T_{gNB-TX,k}$ is the Tx antenna connector, for example of the UE.

In this example, for frequency range 2 (FR2), the reference point for $T_{gNB-TX,k}$ is the combined signal from antenna elements corresponding to a given transmission branch, for example of the UE, a TRP or a gNB.

Measuring Via DL: UE Rx-Rx Time Difference

In this example, measuring the first measurement comprises measuring, via the UL, a UE receive-transmit (Rx-Tx) time difference.

In this example, the UE Rx-Tx time difference k is defined as:

$$T_{UE-RX,k} - T_{UE-TX}$$

where:

$T_{UE-RX,k}$ is the UE received timing of downlink radio frame #i from the k-th gNB, defined by the first or the strongest detected path in time.

In this example, for frequency range 1 (FR1), the reference point for $T_{UE-RX,k}$ shall be the Rx antenna connector of the UE.

In this example, for frequency range 2 (FR2), the reference point for $T_{gNB-RX,k}$ shall be the combined signal from antenna elements corresponding to a given receiver branch of the UE.

In this example, $T_{UE-TX,k}$ is the transmit timing of uplink radio frame #i to the k-th gNB.

In this example, for frequency range 1 (FR1), the reference point for $T_{UE-TX,k}$ is the Tx antenna connector of the UE.

In this example, for frequency range 2 (FR2), the reference point for $T_{UE-TX,k}$ is the combined signal from antenna elements corresponding to a given transmission branch of the UE.

Optionally, the method comprises determining a quality metric for a reference signal time difference, RSTD, a UE receive-transmit time difference and/or a reference signal time difference, RTOA, optionally using a reference signal received power, RSRP.

Optionally, the method comprises determining the quality metric for the reference signal time difference, RTOA, using the reference signal received power, RSRP.

Optionally, the method comprises determining the quality metric for the UE receive-transmit time difference, using the reference signal received power, RSRP.

Optionally, the method comprises determining the quality metric using an UL RSRP, for example for NR UL PRS.

Optionally, the method comprises reporting the quality metric.

Optionally, the quality metric (for example, a PRS-RSRP quality metric) is always reported.

Optionally, the quality metric is derived from other signals, for example a SS-RSRP.

Optionally, the quality metric is reported when necessary, for example based on a triggering mechanism, and/or configured by upper layers, for example LPP/RRC/MAC CE.

Optionally, the triggering mechanism comprises and/or is a low signal reception strength and/or an accuracy error.

Optionally, a periodicity of the reporting is the same or different from a PRS periodicity, for example K times the PRS periodicity, where K is configured by upper layers, for example LPP/RRC/MAC CE.

Although one embodiment has been shown and described, it will be appreciated by those skilled in the art that various changes and modifications might be made without departing from the scope of the disclosure, as defined in the appended claims and as described above.

In summary, the disclosure provides a method of determining a position of a user equipment, UE, in a network so as to improve an accuracy, a precision, an efficiency and/or a speed for determining the position, to reduce a latency for determining the position of the UE and/or enable respective positions of a plurality of such UEs to be determined at higher number densities. Also provided are a UE and/or TRP, a network and a CRM.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method operated by a user equipment (UE) in a network, the method comprising:
    determining whether to perform uplink (UL) measurements or downlink (DL) measurements based on a positioning capability of the UE, and at least one positioning capability of at least one base station;
    when it is determined to perform the DL measurements:
        determining a first measurement among a first set of the DL measurements based on a first required quality of service (QoS),
        performing the first measurement, and
        estimating, a position of the UE according to the first measurement; and
    when it is determined to perform the UL measurements:
        determining a second measurement among a second set of the UL measurements based on a second required QoS, and
        receiving, from the at least one base station, at least one result of measurements for the position of the UE according to the second measurement,
    wherein the first set of DL measurements includes at least one of a measurement associated with a reference signal time difference (RSTD), a measurement associated with a reference signal received power (RSRP), a measurement associated with a signal-to-noise or an interference ration (SINR), and
    wherein the second set of UL measurements includes at least one of a measurement associated with a relative time of arrival (RTOA), a measurement associated with a positioning reference signal-reference signal received power (PRS-RSRP), or a measurement associated with a time difference of signaling.

2. The method of claim 1, wherein performing the first measurement comprises measuring, as the first measurement, at least one of:
    a first RSTD between a neighbor transmission/reception point (TRP) and a reference TRP;
    a second RSTD between a first beam and a reference beam, and the first beam and the reference beam are associated with the same or different TRPs;
    a third RSTD between a first positioning reference signal (PRS) resource of a set of PRS resources and a reference PRS resource of a set of reference PRS resources;
    a fourth RSTD between a first PRS resource set and the reference PRS resource set;
    a positioning reference signal (PRS) reference signal received power (RSRP) (PRS-RSRP); or
    a positioning reference signal (PRS) signal-to-noise and interference ration (SINR) (PRS-SINR).

3. The method of claim 1, wherein performing the second measurement comprises measuring, as the second measurement, at least one of:
    a RTOA of a sounding reference signal (SRS);
    the PRS-RSRP;
    at least one of a receive—transmit time difference of a TRP, a receive—transmit time difference of a g node B (gNB), or a receive—transmit time difference of a location management unit (LMU); or
    a receive—transmit time difference of the UE.

4. The method of claim 1, further comprising determining a quality metric for a RSTD using a RSRP.

5. The method of claim 4, further comprising reporting the quality metric for the RSTD using the RSRP.

6. The method of claim 1, further comprising determining a quality metric for a RTOA using a RSRP.

7. The method of claim 6, further comprising reporting the quality metric for the RTOA using the RSRP.

8. The method of claim 1, further comprising determining a quality metric for a receive—transmit time difference of the UE by using a RSRP.

9. The method of claim 8, further comprising reporting the quality metric for the receive—transmit time difference of the UE.

10. A user equipment (UE), comprising:
    a transceiver; and
    a processor operably coupled to the transceiver,
    wherein the processor is configured to:
        determine whether to perform uplink (UL) measurements or downlink (DL) measurements based on a positioning capability of the UE, and at least one positioning capability of at least one base station,
        when it is determined to perform the DL measurements,
            determine a first measurement among a first set of the DL measurements based on a first required quality of service (QoS),
            perform the first measurement, and
            estimate, a position of the UE according to the first measurement, and
        when it is determined to perform the UL measurements:
            determine a second measurement among a second set of the UL measurements based on a second required QoS, and
            receive, from the at least one base station, at least one result of measurements for the position of the UE according to the second measurement,
    wherein the first set of DL measurements includes at least one of a measurement associated with a reference signal time difference (RSTD), a measurement associated with a reference signal received power (RSRP), a measurement associated with a signal-to-noise or an interference ration (SINR), and
    wherein the second set of UL measurements includes at least one of a measurement associated with a relative time of arrival (RTOA), a measurement associated with a positioning reference signal-reference signal received power (PRS-RSRP), or a measurement associated with a time difference of signaling.

11. A non-transitory, computer-readable medium storing instructions that, when executed by a processor, cause the processor to:
   determine whether to perform uplink (UL) measurements or downlink (DL) measurements based on a positioning capability of the UE, and at least one positioning capability of at least one base station,
   when it is determined to perform the DL measurements:
      determine a first measurement among a first set of the DL measurements based on a first required quality of service (QoS),
      perform the first measurement, and
      estimate, a position of the UE according to the first measurement, and
   when it is determined to perform the UL measurements:
      determine a second measurement among a second set of the UL measurements based on a second required QoS, and
      receive, from the at least one base station, at least one result of measurements for the position of the UE according to the second measurement, wherein the first set of DL measurements includes at least one of a measurement associated with a reference signal time difference (RSTD), a measurement associated with a reference signal received power (RSRP), a measurement associated with a signal-to-noise or an interference ration (SINK), and
   wherein the second set of UL measurements includes at least one of a measurement associated with a relative time of arrival (RTOA), a measurement associated with a positioning reference signal-reference signal received power (PRS-RSRP), or a measurement associated with a time difference of signaling.

12. The method of claim 1, wherein the first set of DL measurements and the second set of UL measurements are determined based on a service client type.

13. The UE of claim 10, wherein the first set of DL measurements and the second set of UL measurements are determined based on a service client type.

14. The non-transitory, computer-readable medium of claim 11, wherein the first set of DL measurements and the second set of UL measurements are determined based on a service client type.

* * * * *